United States Patent [19]
Stucker et al.

[11] Patent Number: 6,061,412
[45] Date of Patent: May 9, 2000

[54] NUCLEAR REACTION PROTECTION SYSTEM

[75] Inventors: David L. Stucker, Gibsonia; William T. Bogard, Harrison City; Larry E. Erin, Monroeville; Hugh J. Murphy, Jr., Pittsburgh; Michael D. Heibel, Penn Township, all of Pa.

[73] Assignee: Westinghouse Electric Company LLC, Pittsburgh, Pa.

[21] Appl. No.: 08/953,001

[22] Filed: Oct. 16, 1997

Related U.S. Application Data

[63] Continuation-in-part of application No. 08/539,803, Oct. 5, 1995, Pat. No. 5,745,538.

[51] Int. Cl.$^7$ ............................................. G21C 3/00
[52] U.S. Cl. ..................... 376/217; 376/246; 376/247; 376/254
[58] Field of Search ................................. 376/254, 255, 376/215, 216, 217, 246, 247, 241

[56] References Cited

U.S. PATENT DOCUMENTS

| | | | |
|---|---|---|---|
| 3,780,292 | 12/1973 | Klar | 376/255 |
| 4,330,367 | 5/1982 | Musick | 376/245 |
| 4,411,858 | 10/1983 | Smith | 376/247 |
| 4,426,352 | 1/1984 | Bybee et al. | 376/255 |
| 4,582,672 | 4/1986 | Tuley, Jr. et al. | 376/215 |
| 4,582,673 | 4/1986 | Neissel | 376/255 |
| 4,637,910 | 1/1987 | Impink, Jr. | 376/216 |
| 4,642,213 | 2/1987 | Impink, Jr. | 376/218 |
| 4,711,753 | 12/1987 | Impink, Jr. et al. | 376/216 |
| 4,770,843 | 9/1988 | Taleyarkhan | 376/216 |
| 4,774,049 | 9/1988 | Impink, Jr. et al. | 376/245 |
| 4,774,050 | 9/1988 | Impink, Jr. | 376/245 |
| 4,804,515 | 2/1989 | Crew et al. | 376/216 |
| 4,839,134 | 6/1989 | Impink, Jr. et al. | 376/216 |
| 4,997,617 | 3/1991 | Newton et al. | 376/216 |
| 5,015,434 | 5/1991 | Wimpee et al. | 376/255 |
| 5,225,147 | 7/1993 | Lin et al. | 376/216 |
| 5,225,149 | 7/1993 | Banda | 376/255 |
| 5,251,242 | 10/1993 | Impink, Jr. et all | 376/254 |
| 5,406,598 | 4/1995 | Takeuchi et al. | 376/241 |

FOREIGN PATENT DOCUMENTS

| | | | |
|---|---|---|---|
| 0058581 | 8/1982 | European Pat. Off. | 376/216 |

OTHER PUBLICATIONS

AELL 5129–L 11, pp. 1–15, by P. Mercier, May 1974.

*Primary Examiner*—Harvey E. Behrend

[57] ABSTRACT

A safety grade protection system for monitoring parameters indicative of the status of a core of a nuclear reactor, and reducing the criticality of the nuclear reaction when the onset of unsafe conditions are detected. The invention directly detects, in real time, the power at a plurality of axial and radial locations within or about the core and provides a three-dimensional real-time core power output. The system processes those outputs together with a measure of core coolant inlet temperature, pressure and flow rate to calculate, in real time, the fuel centerline temperature, the heat transfer condition at the fuel elements' boundary and the rate of power change within the core.

15 Claims, 2 Drawing Sheets

NUCLEAR REACTION PROTECTION SYSTEM

CROSS REFERENCE TO RELATED APPLICATIONS

This application is a continuation in part of application Ser. No. 08/539803 filed Oct. 5, 1995, now U.S. Pat. No. 5,745,538, issued Apr. 28, 1998, entitled SELF-POWERED FIXED IN-CORE DETECTOR.

BACKGROUND OF THE INVENTION

1. Field of the Invention

This invention relates generally to nuclear reactor protection systems and more particularly to methods and apparatus which directly, in real time, measure the power generated within the core of a nuclear reactor at a large number of radially and axially distributed, spaced locations within the core and use that information, together with sensor outputs determinative of the heat removed from the core, to determine when reactor thermal protection should be initiated.

2. Background Information

The performance of a nuclear reactor, like that of many other energy conversion devices, is limited by the temperature which component materials will tolerate without failure. In the case of a nuclear reactor with a core comprising an assemblage of fuel assemblies, which in turn consist of an array of fuel rods or pins, the upper limit of temperature is determined by the fuel rod or fuel pin cladding materials employed. In order to adequately protect the reactor core against excessive temperatures, it is necessary to examine the temperature of the "hottest" fuel pin or the "hottest" coolant channel between adjacent fuel pins in the core, since damage will most likely first occur in the "hottest" fuel pin. Thus, the "hottest" pin or channel becomes the limiting factor for safe reactor core operation.

As is well known, heat is generated in a reactor by a fission process in the fuel material. The fission process, however, produces not only heat but radioactive isotopes which are potentially harmful and which must be prevented from escaping to the environment. To this end, the fuel is clad with a material which retains the fission products. In order to prevent clad overheating and in the interest of precluding release of fission products which would occur on clad damage or failure, coolant is circulated through the reactor core. Heat transferred to the circulating coolant from the fuel elements is extracted in the form of useable energy downstream of the reactor core in a steam generator. Thus, for example, in a pressurized water reactor system the water flowing through the core is kept under pressure and is pumped to the tube side of a steam generator where its heat is transferred to water on the shell side of the steam generator. The water on the shell side is under lower pressure and thus, the thermal energy transferred causes the secondary water to boil. The steam so generated is employed to drive a turbine which in turn motors a generator for the production of electricity.

As the coolant circulates through the reactor core, heat will be transferred to it either through subcooled convection, often referred to as film conduction, or through nucleate boiling. Nucleate boiling occurs at higher levels of heat flux and is the preferred mode of heat removal since it permits more energy to be transferred to the coolant, thereby permitting the reactor to operate at higher levels of efficiency. Nucleate boiling is characterized by the formation of steam bubbles at nucleation sites on the heat transfer surfaces. These bubbles break away from the surface and are carried into the main coolant stream. If the bulk coolant enthalpy is below saturation, the steam bubbles collapse with no net vapor formation in the channel. This phenomenon is called subcooled boiling or local boiling. If the bulk fluid enthalpy is at or above the enthalpy of saturated liquid, the steam bubbles do not collapse and the coolant is said to be in bulk boiling.

If the heat flux is increased to a sufficiently high value, the bubbles formed on the heat transfer surface during nucleate boiling are formed at such a high rate that they cannot be carried away as rapidly as they are generated. The bubbles then tend to coalesce on the heat transfer surface and form a vapor blanket or film. This film imposes a high resistance to heat transfer and the temperature drop across the film can become very large even though there is no further increase in heat flux. The transition from nucleate boiling to film boiling is called "departure from nuclear boiling" (DNB).

Another condition which requires protective action is the occurrence of a high local power density in one of the fuel pins. An excessive local power density initiates centerline fuel melting which may lead to a breach of the fuel clad integrity. In addition, a condition of excessive local power density is unacceptable in the event of a loss of coolant accident since excessive local power density would cause the clad temperature to exceed allowable limits if the coolant were lost. As the result of analysis of loss of coolant accidents, values are established by the reactor designers for the maximum allowable local power densities at the inception of a loss of coolant accident, such that the criteria for acceptable consequences are met. The maximum local power density limit is generally specified as a linear power density (LPD) limit with units of watts per centimeter.

A third condition which acts as an operating limit is the licensed power at which the particular reactor is permitted to run. All three of these limiting conditions for operation must be monitored in order to make reactor operations safe. Since clad damage is likely to occur because of the decrease in heat transfer coefficient and the accompanying high clad temperatures which may result when DNB occurs, or because of an excessive local power density, the onset of these conditions must be sensed or predicted and corrective action in the form of a reduction in fission rate promptly instituted. One way of monitoring DNB in the reactor is to generate an index or correlation which indicates the reactors condition with respect to the probability of the occurrence of DNB. This correlation is called the Departure from Nucleus Boiling Ratio "DNBR". Both the DNBR and LPD limits are indicative of the proximity of operation to the appropriate design limits.

In a complex process, such as a nuclear power plant, numerous sensors are provided to measure various physical conditions in the process, such as for example, pressures, temperatures, flows, levels, radiation, and the state of various components, such as, the position of valves, control rods and whether a pump is operating or not. These measurements are generally used to perform three different functions: process control, surveillance and protection. Process control involves automatic or semiautomatic regulation of process conditions to achieve the desired result. Surveillance encompasses monitoring of process conditions to determine that the desired results are being achieved. Protection is concerned with automatic response to abnormal conditions in the process to prevent the operating conditions from exceeding predetermined design limits and to take steps to mitigate the adverse affects of operation outside of the design limits. In the case of a nuclear power plant in particular, the protection function is the most demanding of the three. In order to assure reliability of protection systems redundant sets of critical sensors are provided. In order to improve the availability of the plant, correlation between the signals produced by the redundant sensors is made a prerequisite to initiation of the response to thereby reduce the probability of spurious interruption of normal operations. For instance, typically four redundant sets of sensors are provided, and an indication by at least two out of the four sensors is required to actuate the emergency or safety system.

Some of the critical process conditions can be measured directly, such as pressurizer pressure in the case of a pressurized water reactor. Others are calculated from measured parameters, such as the DNBR, as previously mentioned. In either case the existing condition is compared with a preselected limiting value, and if the limit is exceeded, a digital signal is generated. These digital signals will be referred to as protection system actuation signals and include trip signals which are used to activate a system which shuts down or "trips" the reactor and engineered safeguard actuation signals which are used to initiate the operation of other plant emergency systems, as is well known in the art. Since more than one such actuation signal is required to initiate the response, they are referred to as "partial trips" or "partial engineered safeguard actuation signals". In the typical prior art system, the sensor signals are grouped for processing in channel sets with each channel set including one sensor signal from each set of redundant sensor signals. As previously mentioned, a common arrangement is to provide four redundant sensors for most parameters, that are arranged in four channel sets for processing. In prior art systems, each channel set includes a number of processing circuits which convert the sensor signals to the appropriate range, calculate the desired parameter from the measured values when necessary, compare the resultant signal with a selected limit value and generate a protection system actuation signal when the limit is exceeded.

In the typical prior art protection system, the four partial trip and partial engineered safeguard actuation signals from each channel set for each parameter are applied to two redundant logic circuits which each perform the selected voting logic, such as two out of four as previously mentioned, on the partial protection system actuation signals. If two out of four of the corresponding partial actuation signals in either of the two logic circuits are initiated, appropriate emergency and safety control systems are actuated.

In making the calculations that determine the core protection functions that are to be compared against the design limits or set points, there are two general regimes that are considered. The first is a calculation of the amount of heat removed from the core which is determined from the flow rate, the temperature of the coolant and the pressure of the primary system. Both flow rate and the pressure can be reliably monitored. However, some prior art devices monitor the core exit temperature for this calculation, because of its applicability to the power calculation as well. However, the temperature of the coolant exiting the core may be stratified and is therefore subject to increased uncertainty due to the variability of the sensor indication. The coolant flowing at the inlet to the reactor vessel is well mixed and thus much more reliable for this calculation. The second regime establishes the three-dimensional power distribution within the core. Prior art systems have relied upon the signals derived from out-of-reactor detectors positioned around the periphery of the reactor vessel to synthesize the in-core power distribution from calculational models and delayed in-core detector responses which were used to identify axial tilts and gross power distribution. As a result, extra margins had to be built into the set points to factor in the uncertainties in these models and the additional sensor inputs, e.g., control rod position and core exit temperature; both subject to large uncertainties in the evaluation of power distributions. An example of such a prior art system is illustration in U.S. Pat. No. 4,330,367 issued May 18, 1982.

Accordingly, there is need for an improved protection system that can operate at reduced set point margins to improve the efficiency and reliability of reactor operation. It is a further object of this invention to provide such a system that relies upon a direct, real time measurement of core power at a plurality of axially and radially spaced locations throughout the core. It is a further object to accomplish that objective with reactor sensor inputs that are all reliable and exhibit small uncertainties in the determination of local reactor power generation.

SUMMARY OF THE INVENTION

A safety grade protection system for monitoring parameters indicative of the status of a core of a nuclear reactor, which provides a command to reduce the criticality of the nuclear reaction when the onset of an unsafe condition is detected. The system receives inputs from a three-dimensional in-core power monitor that directly measures the power generated within the core, in real time, at a plurality of axial and radial points within and around fuel bundles that are the source of the nuclear reaction. The system also receives inputs from a plurality of sensors which monitor parameters characteristic of the heat removed from the core in real time. The system processes the inputs from the power monitor and the plurality of sensors and from those inputs directly calculates, in real time, values representative of the actual condition of the fuel, the heat transfer condition at the boundary of each fuel element and the rate of power change within the core and compares those values against corresponding set points representative of the limits of acceptable operation for each of those conditions. The system sends a signal to reduce the nuclear reaction within the core below criticality if any of those points are exceeded.

In a preferred embodiment of the invention the conditions which are calculated by the system include the fuel centerline temperature, thermal overpower and Departure from Nucleous Boiling Ratio. In this embodiment the sensor inputs to the system include the core coolant inlet temperature, pressure and flow rate. The system processor is preprogrammed with a form factor comprising information on the physical configuration of the core and a signal/power conversion factors. The outputs provide a direct identification of core conditions, in real time, which reduces the necessity of building in uncertainty margins into the set points that the processor's calculations are compared to, and thus enables the core to be operated more efficiently, at a higher power rating.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENTS

This invention provides a thermal protection system for a nuclear reactor that relies upon a real time, direct measurement of three-dimensional core power, core inlet temperature and pressure. While the specific embodiment described is directed to a pressurized water reactor, the system of this invention is applicable to all thermal-spectrum power reactors that can accommodate fixed in-core detectors within the reactor neutron field, including boiling water reactors, and VVER, RBMK and CANDU Plants.

The reactor thermal protection system of this invention, which will be referred to as the SENTINEL™ thermal protection system, uses a prompt responding fixed in-core detector referred to as the PARSSEL™ detector, to provide thermal protection for a nuclear reactor. The PARSSEL™ detector is unique in that it will provide signals that are directly proportional to reactor power generation without time delay and without sensor degradation due to exposure. The PARSSEL™ detector accomplishes the prompt response using gamma sensitive platinum sensor elements which provide rapid response with practical signal levels, combined with a vanadium sensor which supplies a neutron sensitive, co-resident element which is used in this invention to provide real-time cross-calibration of the relationship between gamma flux, neutron flux and reactor power generation. By contrast, the prior art fixed in-core detectors, mostly used rhodium as the active sensor material, which responds to the neutron flux distribution with time constants measured in minutes, rendering such devices useless for reactor thermal protection due to the excessive time lag in responding to changes in the neutron flux distribution. Prior vanadium element devices had been considered, but suffered from longer time lag than Rhodium, unacceptable signal level, reliability and degradation. The PARSSEL™ detector is more fully described in co-pending U.S. Pat. No. 5,745,538, issued Apr. 28, 1998 assigned to the assignee of this Application.

The SENTINEL™ protection system uses the signals from the PARSSEL detectors processed by a four train digital processing system such as the EAGLE-21™ IEEE Class 1E protection digital hardware or OVATION™, both commercially available from the assignee of this application and more fully described in U.S. Pat. No. 4,804,515, issued Feb. 14, 1989. The further improvement of this invention is implemented by application software which constructs a real-time measurement of the three-dimensional in-core power distribution, from the directly monitored PARSSEL™ detector inputs to provide reactor thermal protection. The ability to directly measure and calculate real-time power distributions within the reactor with high precision overcomes the most serious limitation of prior art thermal protection systems.

Figure 1:
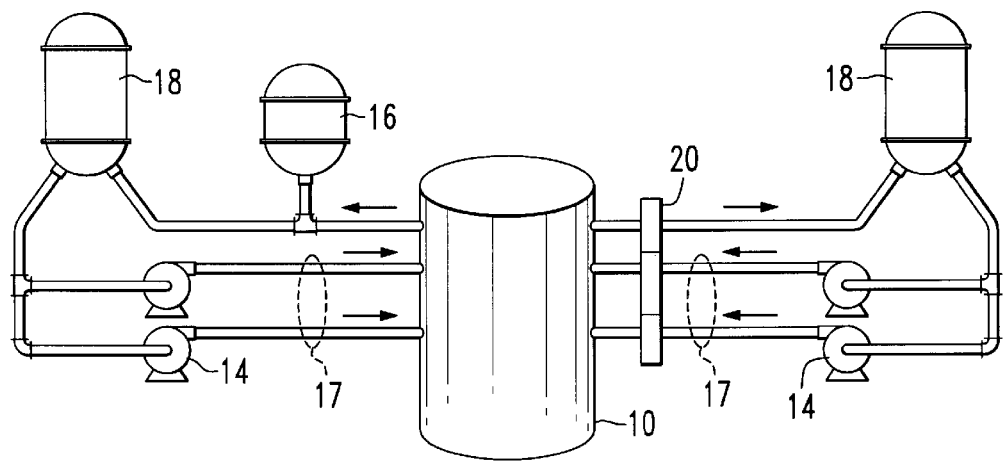
FIG. 1 is a schematic representation of the primary side of a nuclear power generating system.

Prior art reactor thermal protection systems inferred power distribution within the reactor from sensors located physically outside of the reactor. The measurements used for this purpose include segmented neutron detectors located peripheral to the reactor vessel, the coolant loop temperature differential (hot leg minus cold leg) and control rod position. The use of out-of-reactor sensors contribute relatively large uncertainties and require large expenditures of cycle-specific engineering costs to translate the inferred signals into a meaningful and precise reactor thermal protection algorithms. By contrast, the existence of a real-time three-dimensional reactor power distribution direct measurement, when taken together with measurements of core inlet temperature and coolant flow rate and pressure, provide all of the data necessary to perform design-quality safety evaluations in the reactor thermal protection algorithms; without the need for extensive and expensive cycle-specific reload engineering and the thermal margin loss resulting from the use of conservative, or overly simplified assumptions, or the reconstruction algorithm uncertainty associated with the use of ex-core sensors inferring in-core reactor thermal power distributions. The plant sensors required by a SENTINEL™ protection system application in a pressurized water reactor or a VVER are schematically illustrated in FIG. 1. The SENTINEL™ protection system uses the measured reactor power distribution to provide for a reactor trip that precludes fuel damage due to fuel melting or cladding burnout using three specific protective functions. The first of these functions is the fuel centerline melting protection and is accomplished by limiting maximum linear power generation. The limitation of maximum linear power generation is accomplished by the real- time measurement of the three-dimensional reactor power distribution using the output of the PARSSEL™ in-core detector system using the SENTINEL™ power distribution measurement algorithms. The SENTINEL™ system provides a real-time measurement of the maximum linear power density throughout the reactor and compares this value to an input value below which fuel melting has been determined not to occur. Time compensation is also applied to the measured value such that the delays between the generation of a reactor trip and actual reactor shutdown, including stored energy effects, are properly and conservatively accounted for. The second protective function limits total reactor thermal output and rapid power changes that may damage the fuel and/or the reactor pressure boundary by limiting total reactor power to an absolute maximum value (thermal overpower) or a time dependent set point based on a time-lagged current power plus a constant bias. The limitation of total reactor power generation is accomplished by the real-time measurement of the three-dimensional reactor power distribution using the output of the PARSSEL™ in-core detector system using the SENTINEL™ power distribution measurement algorithms. The SENTINEL™ system provides a real-time measurement of the reactor power density throughout the reactor. The total reactor power generation is compared to a variable set point that is computed as the minimum of the rated thermal power of the reactor and the current value plus a time-lagged constant bias. This algorithm provides thermal overpower protection throughout the power range and protection against reactivity increase events at partial power. Time compensation is also applied to the measured value such that the delays between the generation of a reactor trip and actual reactor shutdown, including stored energy effects, are properly and conservatively accounted for. The final reactor protection algorithms designed to preclude cladding burnout by limiting the fuel rod local heat flux values and the resulting coolant heat transfer regime to heat flux values below which the departure from nucleate boiling might occur. The SENTINEL™ protection system accomplishes this protection function by using the measured three-dimensional power distribution combined with the coolant inlet temperature, flow and pressure to compute the coolant heat transfer fluid conditions for each fuel bundle in the reactor. The coolant conditions are combined with the thermal/hydraulic features of the fuel bundle, e.g., mixing vane grids or local hydraulic mismatch, and are used to compute the maximum allowable heat flux throughout the reactor. The maximum heat flux values are then compared to the measured heat flux. Time compensation is also applied to the measured value such that the delays between the generation of a reactor trip and actual reactor shutdown, including stored energy effects, are properly and conservatively accounted for. The actual algorithms referred to for computing these values are well known in the art.

The inputs to the SENTINEL™ protection system are generally illustrated in the schematic representation of the primary system of a nuclear power generation station illustrated in FIG. 1. The PARSSEL™ detector fixed in-core detectors are situated in instrumentation tubes within the core 10 housed within the reactor vessel. The temperature input is obtained from resistance temperature devices in the cold leg 12. Flow rate is determined by sensors within the reactor coolant pumps 14 positioned on the cold leg. Pressure is measured in the system pressurizer 16 which is connected to the hot leg just upstream of the steam generator 18. The ex-core detectors 20 are shown, however, are not employed to develop protection system actuation signals during normal power operation. The ex-core detectors are used, in accordance with this invention, during start up operation and after a trip actuation signal has been initiated.

Figure 2:
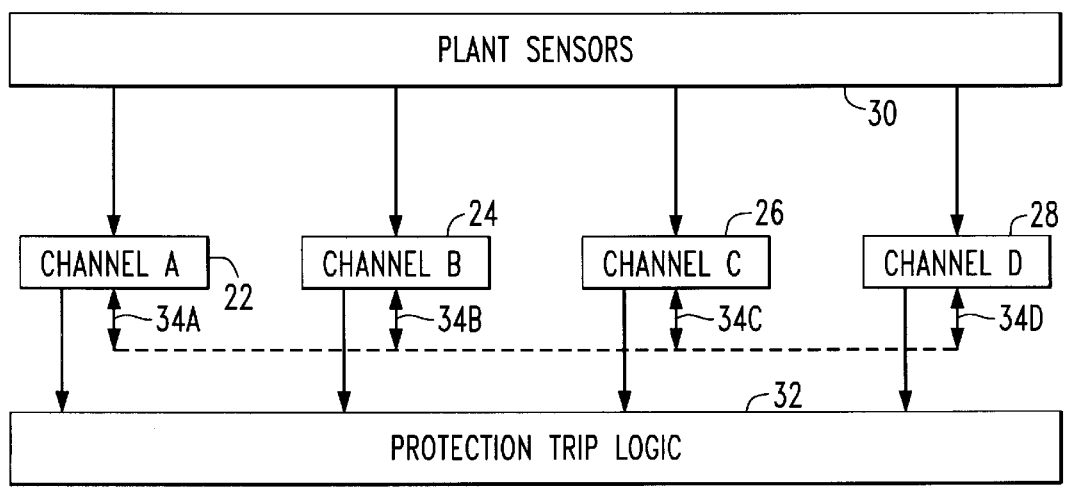
FIG. 2 is a block diagram illustrating the protection system architecture of this invention.

The SENTINEL™ protection system functional design is based on a typical four-train architecture which allows for safe and reliable operation while also providing the ability to perform on-line maintenance and calibration with a channel in bypass. The remaining three channels are sufficient to provide two out of four trip logic and allow for a single channel failure as more fully described in the aforereferenced U.S. Pat. No. 4,804,515. The SENTINEL™ protection system functional block diagram is illustrated in FIG. 2. Outputs from the PARSSEL™ detector sensors are shared between SENTINEL™ protection system channels 22, 24, 26 and 28. Each SENTINEL™ protection system channel receives one-forth of the PARSSEL™ detector strings (sensors) as input and communicates the results of the input processing to the other protection channels via IEEE Class 1E qualified and isolated communication channels 34A, 34B, 34C and 34D shown in FIGS. 2 and 3. In this manner, each SENTINEL™ protection system channel has a complete compliment of PARSSEL™ fixed in-core detector signals measuring the power distribution within the reactor. The data communications between SENTINEL™ protection system channels are designed to meet all licensing separation and isolation requirements. The output of the SENTINEL™ protection system processing of the PARSSEL™ detector segment inputs, will be the average reactor power over the individual segment lengths and the validity/quality status of each segment. The number of segments will vary between applications over the range of four to ten as generally illustrated by reference character 48 in FIG. 3. The segments, which are more fully described in application Ser. No. 08/539,803, previously cited, measure power in different elevations of the reactor and are used to reconstruct the axial power distribution. The SENTINEL™ protection system also takes the input of the coolant condition measurements of inlet temperature, pressure and flow rate to calculate the DNBR. Each SENTINEL™channel has a complete set of independent sensors of these parameters so that both the sensor separation requirements and operational reliability requirements are met. Accordingly each channel 22, 24, 26 and 28 has four temperature and four flow sensors (one for each coolant loop) and a pressurizer pressure sensor associated with it.

Figure 3:
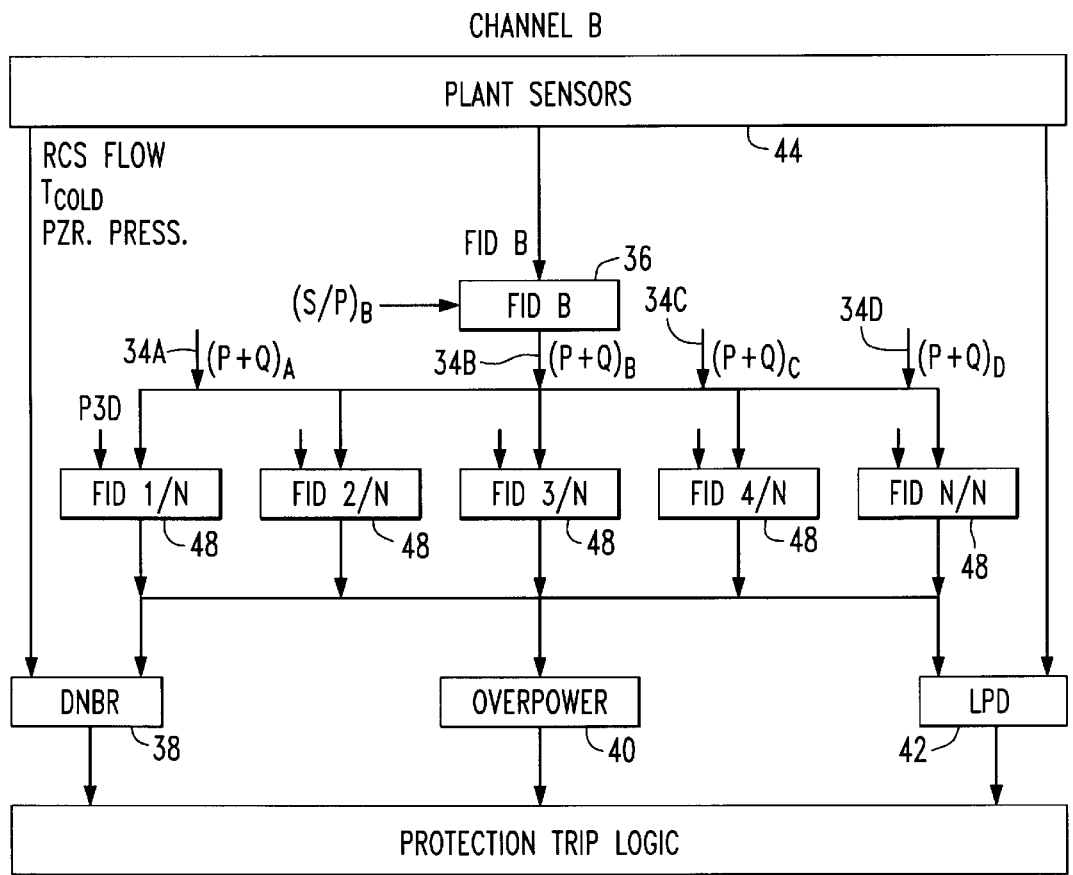
FIG. 3 is a functional block diagram of the processing of the sensor signals of this invention.

FIG. 3 represents a functional block diagram of one SENTINEL™ protection system channel 24 illustrating the calculational flow path of this invention. The SENTINEL™ protection system calculation cycle begins with the input of the PARSSEL™ detector vanadium and platinum segments which are part of the plant sensor input signals 44. The power measurement at each segment is obtained by reading the vanadium current from the PARSSEL™ detector string and applying a precalculated signal/power conversion (S/P) supplied from the reactor physics package contained either in the on-line monitor (such as the BEACON software package commercially licensable from the assignee of this invention) or as part of the off-line core design supplied by the core manufacture. The S/P is expressed in units of watts per ampere-meter. The measured vanadium power provides an on-line measurement of neutron power throughout the reactor, but is delayed in time response due to the nature of the beta decay required to generate the charge collected as the segment current. Fortunately, vanadium activation and decay are precisely understood. All naturally occurring vanadium is the isotope $V^{51}$. When the vanadium emitter is placed in a neutron field, unstable $V^{52}$ is created which decays to $Cr^{52}$ by beta emission with a 3.76 minute half-life. The rate equation describing the production of $V^{52}$ is set forth below as Equation 1.

$$\frac{dV}{dt} = -\lambda_{V52} V + k I_{Pt}(t) \qquad \text{Equation 1}$$

$$I_V = \alpha \lambda_{V52} V$$

$\alpha$ and $k$ are calibration constants

Equation 1 provides the response of a simulated vanadium detector using the prompt responding platinum as the forcing function and is easily evaluated in the digital processing hardware, e.g., the EAGLE-21™ system previously referenced. The measured and simulated response are compared and the ratio is formed to provide the on-line cross-calibration of the platinum sensors to the vanadium sensors. This processing to validate the PARSSEL™ detector is illustrated by block 36 in FIG. 3. After the PARSSEL™ string signals have been processed as discussed above and the signals have been transmitted to each SENTINEL™ protection system channel, the reactor power distribution curve fitting process starts by separating the PARSSEL™ detector signals into their respective axial levels and forming the ratio of measured to predicted power (M/P) at the instrumented radial core locations for each of the axial elevations. The predicted powers, as is well known in the art, are established from a form factor, which is a function of enrichment and fuel management, is defined and inputted into the protection system, for example, between fuel cycles. The form factor can be defined by either the on-line core monitor or through the use of routine core design calculations. The M/P values are then fitted using a surface spline as illustrated below in Equation 2.

$$\left(\frac{M}{P}\right)_j = A_0 + A_1 x_j + A_2 y_j + \sum_{i=1}^{N} F_i r_{ij}^2 \cdot \ln r_{ij}^2 + T_j \cdot F_j \qquad \text{Equation 2}$$

where:

$x_j, y_j$ are the coordinates of point $j$ $r_{ij} = \sqrt{(x_i - x_j)^2 + (y_i - y_j)^2}$ $A_0, A_1, A_2$ and $F_i$ are fitting coefficients $T_j$ is the tolerance factor for $j$-th sensor The SENTINELS protection system evaluates the surface spline fitting function for each axial level and provides a tolerance factor $T_x$ for each sensor based on the variability of the sensor over time, which is determined as part of the validation process. The surface spline fitting with the tolerance factors provides the means for handling signal validation and failed segment replacement on-line. If the accuracy of the PARSSEL™ detector segment at a certain location is determined to be low or the detector segment and/or string have failed, then a large $T_x$ value is assigned to that location and the interpolation is allowed to deviate from the measured value. Conversely, high accuracy points have a low $T_x$ value which forces the interpolation through the measured value. Once the surface spline fitting function has been evaluated, the interpolated M/P values of the individual PARSSEL™ detector segments for each core location are obtained using Equation 3 below.

$$\Gamma(x,y)_k = P(x,y)_k \cdot \left[ A_0 + A_1 x + A_2 y + \sum_{i=1}^{N} F_i r_i^2 \cdot \ln r_i^2 \right] \quad \text{Equation 3}$$

where:

$$r_i = \sqrt{(x-x_i)^2 + (y-y_i)^2}$$

$Q(x,y)_k$ is the predicted power of the $k$-th segment

The result of Equation 3 above is the measured absolute power in watts per centimeter for a simulated PARSSEL™ detector segment in each fuel bundle in the reactor. It is important to note that the surface spline fitting process is completely independent for each PARSSEL™ detector segment level and can, therefore, be solved using parallel processing to reduce solution execution time.

The final remaining task for a three-dimensional power distribution curve construction is the formation of an axial heat flux profile for each fuel bundle. The methodology used for construction of the absolute axial power distribution follows. While a number of algorithms exist to accomplish this task, an integral representation of a truncated Fourier series is employed as the basis for SENTINEL™ protection system axial power distribution curve construction in this embodiment. Though it should be understood that the invention is not to be limited by this approach. The Fourier series is illustrated by Equation 4, below.

$$P(x,y,z) = \sum_{n=1}^{N} A(x,y)_j \sin\left( \frac{n\pi(z + \epsilon_b)}{(L + \epsilon_b + \epsilon_i)} \right) \quad \text{Equation 4}$$

The SENTINEL™ protection system uses a Fourier series truncated at the number of PARSSEL™ detector segments. The Fourier series coefficients were evaluated by integrating Equation 4 above, as shown below in Equation 5.

$$\Gamma(x,y)_j = \int_{zb_k}^{zt_k} dz' P(z')_j = \int_{zb_k}^{zt_k} dz' \sum_{n=1}^{N} A_n \sin\left( \frac{n\pi(z' + \epsilon_b)}{L + \epsilon_b + \epsilon_i} \right) \quad \text{Equation 5}$$

The results of Equation 5 can be cast into a set of N simultaneous equations with N unknowns as shown in matrix notation below as Equation 6.

$$\|C\| \times A(x,y) = |P(x,y)| \quad \text{Equation 6}$$

Each element of the coefficient matrix, $C_{i,n}$, of Equation 6 has the form shown below in Equation 7.

$$C_{i,n} = \int_{zb_i}^{zt_i} dz' \sin\left( \frac{n\pi(z' + \epsilon_b)}{(L + \epsilon_b + \epsilon_i)} \right) \quad \text{Equation 7}$$

Equation 8 represents the results of the integration of each element of the coefficient matrix $C_{i,n}$, in Equation 6 as defined in Equation 7.

$$C_{i,n} = \frac{(L + \epsilon_b + \epsilon_i)}{n\pi} \left[ \cos\left( \frac{n\pi(zt_i + \epsilon_b)}{L + \epsilon_b + \epsilon_i} \right) - \cos\left( \frac{n\pi(zb_i + \epsilon_b)}{L + \epsilon_b + \epsilon_i} \right) \right] \quad \text{Equation 8}$$

The coefficient matrix, C, of Equation 6 whose individual elements have been defined in Equation 8 is dependent only upon the geometry of the core and can, therefore, be precalculated and inverted such that Equation 6 can be solved for the Fourier expansion coefficients in terms of the segment power, $P(xy)_j$, as shown in matrix notation below as Equation 9.

$$|A(x,y)| = \|C_{i,n}\|^{-1} \times |(xy)| \quad \text{Equation 9}$$

The results of Equation 9 define a Fourier series representation for the absolute power generation for each fuel bundle in the reactor. This power distribution then forms the input to the calculation of the thermal protective functions, variable overpower 40, high linear power density 42 and low-DNBR 38 as shown in FIG. 3. The variable overpower trip is provided to limit the maximum reactor thermal output as well as the maximum allowed change over short periods of time. The thermal output of the reactor is measured as the integral of the power distribution over the reactor volume. A trip set point is computed that is the minimum of a fixed overpower set point and a variable set point that is time-lagged current power plus set point bias. The variable set point is designed to arrest reactivity insertion events, e.g., uncontrolled control rod withdrawal, prior to generating large power mismatches between reactor and turbine power and to mitigate reactor coolant system pressure changes.

The high linear power density trip function computes the maximum local power in the reactor and compares the current value to an externally inputted value that corresponds to fuel centerline melting. This value is typically obtained from the manufacturer. Appropriate time filtering is included to assure that centerline melting does not occur during a transient with allowances for reactor trip actuation, control rod insertion and stored energy affects.

The low-DNBR trip is the final reactive thermal protector function provided the SENTINEL™ protection system to prevent fuel cladding overheating. The low-DNBR trip uses the detailed power distribution measurement provided by the PARSSEL™ detectors and the coolant conditions measured by the remaining reactor coolant system sensors inputted to the system, to compute the current DNBR for each fuel bundle and compares that value to the safety limit. Appropriate time filtering is included to assure that the actual DNBR remains above the safety limit during a transient with allowances for reactor trip actuation, control rod insertion and stored energy affects.

The SENTINEL™ protection system permits a significant simplification of the protection system sensors while generating real safety margins. The additional thermal margin is generated by more precise measurement of real-time power distributions within the reactor without requiring inordinate cycle-specific engineering support. The SENTINEL™ protection system simplifies sensor input to the protection system by measuring the reactor power directly using the PARSSEL™ fixed in-core detectors, thus eliminating the need for hot-leg temperature measurements and power range ex-core nuclear instrumentation. The requirements for ex-core nuclear instrumentation are reduced to start up range where the signal levels for the PARSSEL™ detectors will be too low. In addition, the SENTINEL™ protection system eliminates the need for protection grade rod position indication and will provide thermal margin benefit typically associated with protection grade rod position indication systems where not installed. It is important to note that all of the sensors that are no longer required have proven to introduce uncertainties in operation. Additionally, significant thermal margin improvements are made available for drop rod events without the need for protection grade rod position indication or withdrawal block systems.

Finally, the need to assume a radial peaking factor power dependence is obviated with the ability for direct measurement of power distributions. Operation with heavily rodded configurations as well as operation using part length control rods are rigorously protected without adding tremendous complexity to the protection algorithms or the cycle specific calculations that need to be made.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of invention which is to be given the full breath of the claims appended and any and all equivalents thereof.

What is claimed is:

1. A safety grade protection system for (i) monitoring parameters indicative of the status of a core of a nuclear reactor including nuclear fuel and control rods and having radial and axial dimensions, the parameters including a measure of neutron output at a plurality of axial and radial points within the core, and (ii) reducing the criticality of the nuclear reaction within the fuel when the onset of an unsafe condition is detected, the protection system comprising:

an in-core power monitoring system having a plurality of radially spaced detectors, each of said detectors extending substantially over the axial length of the core and responsive in real time to provide a neutron sensitive output, that is apportioned among a plurality of axial segments of the core, without consideration of a delayed gamma or control rod emitted gamma response, said monitoring system providing a real time, three-dimensional direct measurement of the plurality of axial and radial points within the core at least normal operating power levels and having an output representative of the actual power measured at those points;

a plurality of sensors for monitoring parameters characteristic of the heat removed from the core in real time and respectively providing an output characteristic of each of those parameters; and a processor having an input from the power monitoring system and the plurality of sensors and from those inputs and without a determination of control rod position, directly calculates, in real time, values representative of the actual condition of the fuel, the heat transfer condition at the fuel boundary and the rate of power change within the core compares those values against corresponding set points representative of the limits of acceptable operation for each of those conditions, and sends a signal to reduce the nuclear reaction within the core below critically if any of those set points are exceeded.

2. The protection system of claim 1 for controlling a reactor having a coolant flowing through the core, wherein the plurality of sensors monitor the inlet temperature of the coolant entering the core, the coolant flow rate and the pressure within the core.

3. The protection system of claim 1 for controlling a reactor having a coolant flowing through the core, wherein the plurality of sensors consist to a core inlet temperature sensor, a pressure sensor and a coolant flow sensor.

4. The protection system of claim 1 wherein the processor calculates the fuel centerline temperature, thermal overpower and the departure from nuclear boiling ratio.

5. The protection system of claim 1 wherein the processor is preprogrammed with a form factor comprising information on the physical configuration of the core and a signal/power conversion factor.

6. The protection system of claim 1 wherein the in-core power monitoring system provides the protection systems power input after startup and through the range of safe power operation including ex-core detectors from which the core power is inferred during startup and after a trip signal is initiated to effect a reduction in the nuclear reaction after a set point has been exceeded.

7. The protection system of claim 1 wherein power is calculated directly, without simulation.

8. The protection system of claim 7 wherein power is calculated directly, on-line in real time.

9. The protection system of claim 8 wherein power is calculated directly without recourse to historical operating considerations.

10. The protection system of claim 5 wherein power is calculated directly, online, without input of the product of off-line calculations other than the form function and conversion factor.

11. The protection system of claim 1 wherein the processor comprises four independent channels and the outputs from ¼ of the monitored points within the core provided by the power monitoring system are inputted to each of the redundant channels which processes those outputs and provides the processed results as inputs to each of the other channels.

12. The protection system of claim 11 wherein the processed signals from each channel are communicated to the other channels over isolated data links.

13. The protection system of claim 1 wherein the power measured at each point in the core is validated against a second independent monitored power input from that point which is captured within the same relative time period.

14. The protection system of claim 13 wherein the processor generates a power curve formed from a surface spine fitting function for each axial level and provides a tolerance factor, resulting from the validation process, for a detector at each point at which the power is directly measured within the core, that is based on the variability of the detector over time and uses that tolerance factor to guide the spine function to either force the curve through the measured value or allow it to deviate where the accuracy of the detector has been put into question.

15. A safety grade protection method of monitoring parameters indicative of the status of a nuclear reactor core including control rods and nuclear fuel and having radial and axial dimensions, the parameters including a measure of neutron output at a plurality of axial and radial points within the core during normal reactor power operation, to provide a trip signal if safe operating limits are exceeded comprising of steps of:

employing a plurality of radially spaced in-core detectors, each of said detectors extending substantially over the axial length of the core and responsive in real time to provide a neutron sensitive output, that is apportioned among a plurality of axial segments of the core, without consideration of a delayed gamma or control rod emitted gamma response, which is a real time, direct measurement of core power at the plurality of axial and radial points within the core;

sensing parameters characteristic of the heat removed from the core in real time and respectively providing an output characteristic of each of those parameters;

processing the outputs of the in-core detectors and the parameters sensed and from those outputs and without recourse to control rod position directly calculating, in real time, values representative of the actual condition of the fuel, the heat transfer condition at the fuel boundary and the rate of power change within the core;

comparing those values against corresponding set points representative of the limits of acceptable operation for each of those conditions; and sending a signal to reduce the nuclear reaction within the core below critically if any of those set points are exceeded.

* * * * *